United States Patent [19]

Gray

[11] Patent Number: 4,755,333
[45] Date of Patent: Jul. 5, 1988

[54] MOLD METHOD AND APPARATUS FOR PLASTIC SHELLS

[75] Inventor: John D. Gray, New Durham, N.H.

[73] Assignee: Ex-Cell-O Corporation, Walled Lake, Mich.

[21] Appl. No.: 14,754

[22] Filed: Feb. 13, 1987

Related U.S. Application Data

[63] Continuation of Ser. No. 750,640, Jul. 1, 1985, abandoned.

[51] Int. Cl.⁴ ............................................. B29C 41/18
[52] U.S. Cl. ...................................... 264/37; 264/126; 264/302; 425/217; 425/434; 425/435
[58] Field of Search ............ 264/126, 245, 255, 297.6, 264/301, 302, 246, 310, 37; 425/257, 258, 434, 435, 215, 217

[56] References Cited

U.S. PATENT DOCUMENTS

| | | | |
|---|---|---|---|
| 1,597,803 | 8/1926 | Kearney et al. | 425/258 X |
| 3,506,755 | 4/1970 | Rudder et al. | 264/302 X |
| 3,621,535 | 11/1971 | Ringal | 264/302 X |
| 3,801,255 | 4/1974 | Meyer et al. | 425/435 X |
| 3,829,272 | 8/1974 | Carillon et al. | 425/430 |

Primary Examiner—Jeffery Thurlow
Assistant Examiner—Mary Lynn Fertig
Attorney, Agent, or Firm—John C. Evans

[57] ABSTRACT

Apparatus and a process for manufacturing thin walled hollow plastic shells for parts such as automobile door panels, controls and instrument panels from dry thermoplastic powders includes a plurality of powder boxes and an open-ended heated mold. Each charge box is carried by an indexable carousel which has a drive motor controlled by a programmable controller to position the carousel to off-load a given color to a powder casting mold carrier which is associated with means for sequentially and continuously (1) preheating a mold; (2) dumping powder from an off-loaded color box into a heated mold; (3) curing the cast powder in the mold; (4) cooling the mold; and (5) stripping the part from the mold.

10 Claims, 4 Drawing Sheets

MOLD METHOD AND APPARATUS FOR PLASTIC SHELLS

This is a continuation, of application Ser. No. 750,640, filed on July 1, 1985, now abandoned.

TECHNICAL FIELD

This invention pertains to a method and apparatus for making hollow plastic articles especially suitable for use in automobile trim components such as interior door panels and more particularly to methods and apparatus for processing plastic powder to form articles of different color or the same color on a continuous programmable basis.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired particularly in the interior design of automobiles.

The current state of the art includes a pre-formed grained vinyl shell made from dry thermoplastic powder particles which are applied to a heated shell mold from a powder box to form a continuous monochromatic one-piece shell or to form a shell which includes two separate plastic shell sections formed from different colored plastic joined at a connection joint.

The use of multi-color plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

Apparatus and method for multiple colored thermoplastic floor materials are set forth in U.S. Pat. No. 3,383,442 issued May 14, 1968.

Neither of the aforesaid methods and apparatus for manufacture or resultant manufacture is directed to a process or apparatus for manufacturing a single piece shell from powder material suitable for use as an interior panel component of an automobile on a continuous basis, programmed to produce articles of a different monochromatic color or the same monochromatic color or alternatively to produce such articles having two-tone color segments.

STATEMENT OF INVENTION AND ADVANTAGES

In accordance with the present invention a process and apparatus for loading an open-ended heated mold with powder plastisol material includes the process of releasing a pre-charge of one monochromatic color from a single compartment or two or more colors of thermoplastic powder from separate compartments in a powder box for gravity flow into a preheated mold with means configured to produce either a one-piece shell with one monochromatic color or such a shell with two or more color tones to enhance the decor of the interior of an automobile and to do so by provision of a color carousel with plural powder boxes that are indexed on a programmable basis to be selectively associated with the preheated mold.

A preloaded open-ended powder box is filled with a predetermined quantity of different color powder. The loaded open-ended powder box is carried by an indexable carrier that off-loads the box from the carrier to a mold carrier and frame assembly. The powder box is clamped to an open-ended mold on the carrier to form a closed system. The closed system is rotated so that the charge box releases the powder from the powder box compartments to flow evenly across the open end of the mold by gravity to produce a uniform thin shell across heated casting surfaces of the mold. Joint seals can be provided in association with two-color compartments to produce distinct strips of colors in a single-piece article with an integral joint formed between each color. Such two-tone pieces and tooling for manufacturing such pieces are set forth in co-pending U.S. patent application Ser. No. 614,004 filed May 25, 1984, now U.S. Pat. No. 4,562,025, and commonly assigned.

Plastics molding apparatus of the invention has a gravity fill system for flow of powder material into a heated mold to form a thin walled single plastic part of a color determined by the programmed indexation of the powder box carrier and off-loading of a powder box to means for coupling the powder box to a preheated mold and by provision of means for operating the coupled powder box and mold to dispose the charge box with respect to the mold for gravity flow of powder from the powder box into the mold so that flow of powder into the mold covers uniformly heated separate surfaces of the mold with either the same or different colors of plastic connected at a joint region to form a single part with at least two color panels there across.

The mold-frame and mold apparatus are carried by indexable apparatus with respect to a preheat oven; the casting station; a cure oven; a cooling station; and a stripping position. In one embodiment the mold-frame and mold are carried on a multiple station manufacturing unit or octopus with a rotatable carriage and individual robot arms that reciprocate and rotate to off-load the powder box while casting powder to a mold.

In another embodiment the mold-frame and mold are carried by separate robot which has an extendable arm that will position the mold at separate processing stations including a casting station.

Other advantages and a more complete understanding of the invention will be apparent to those skilled in the art from the succeeding detailed description of the invention and the accompanying drawings thereof.

DETAILED DESCRIPTION OF THE INVENTION

Figure 1:
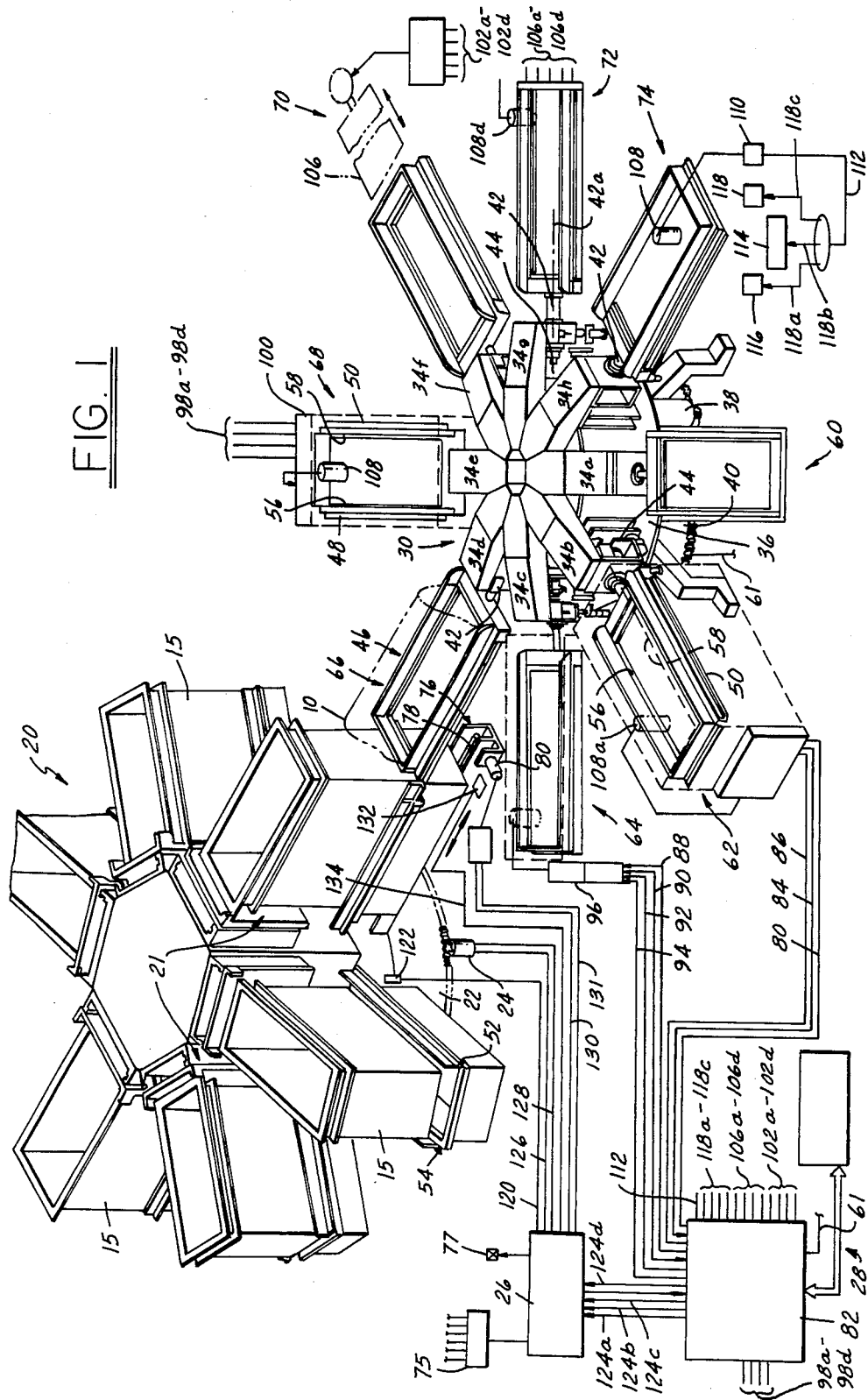
FIG. 1 is a perspective view of a powder box carrier and associated molding apparatus of the present invention shown with associated controls for programming indexing of a particular color box onto the molding apparatus.

The process and apparatus of the present invention will be with reference to the production of plastic thin-walled shells for a typical automotive part such as an interior door panel, consoles and instrument panels. However it has application in the manufacture of other parts which are desirably processed by pre-programming production of different runs to have the same or different color.

Typical automobile door panel have for either monochromatic or multi-color, single-piece interior plastic shells. The shell, preferably made of polyvinyl chloride material, is backed by a layer of polyurethane foam bonded to the shell by a mold process such as in U.S. Pat. No. 3,123,403, issued Mar. 3, 1964 for Automobile Arm Rest. An interior reinforcing insert may be connected at an outer shell.

The shell is a one-piece plastic part either of monochromatic color or with an integral first panel of a dry-cast plastic having a first color an integral joint to a second panel having a second color contrasting or complementing the color of the first panel or other interior components. For example, the upper panel can be red, blue, yellow or beige to contrast with or complement the interior color of seats, headliners, crashpads and the like. The lower panel can be colored a deeper complementary tone color of a character which has a low impact or scuff display character. Such two-tone structures and tooling for producing the casting of two colors is set forth in the aforementioned U.S. Ser. No. 614,004.

Referring to FIGS. 4–10, a powder molding process is schematically shown as including a selectively heated mold 10.

The box 12 includes an open end 14. The box 12 is supplied from a reservoir 15 having a distribution plate 16 operated to cast thermoplastic powder through an opening to fill box 12.

Figure 8:
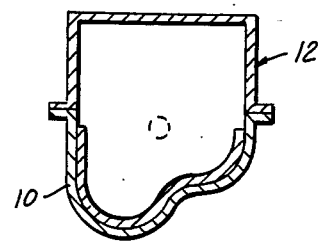
Figure 5:
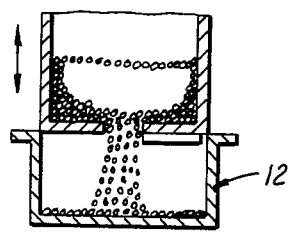
Figure 9:
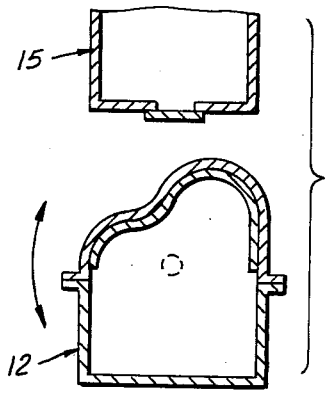
Figure 6:
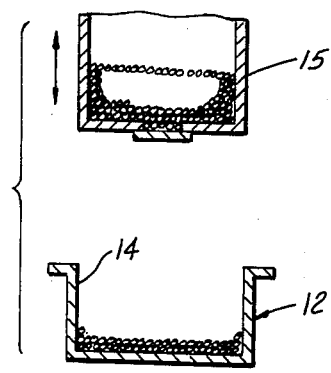
Figure 7:
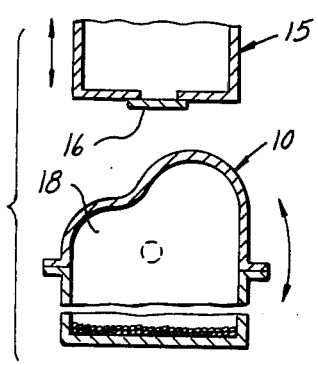

Clamp means, not shown, join and seal the powder box 12 to mold 10 when the box 12 is in the positions shown in FIGS. 7–9.

As a result, the interior of box 12 and the interior of mold 10 form a closed system 18 having one or more powder charges in the box 12.

Figure 3:
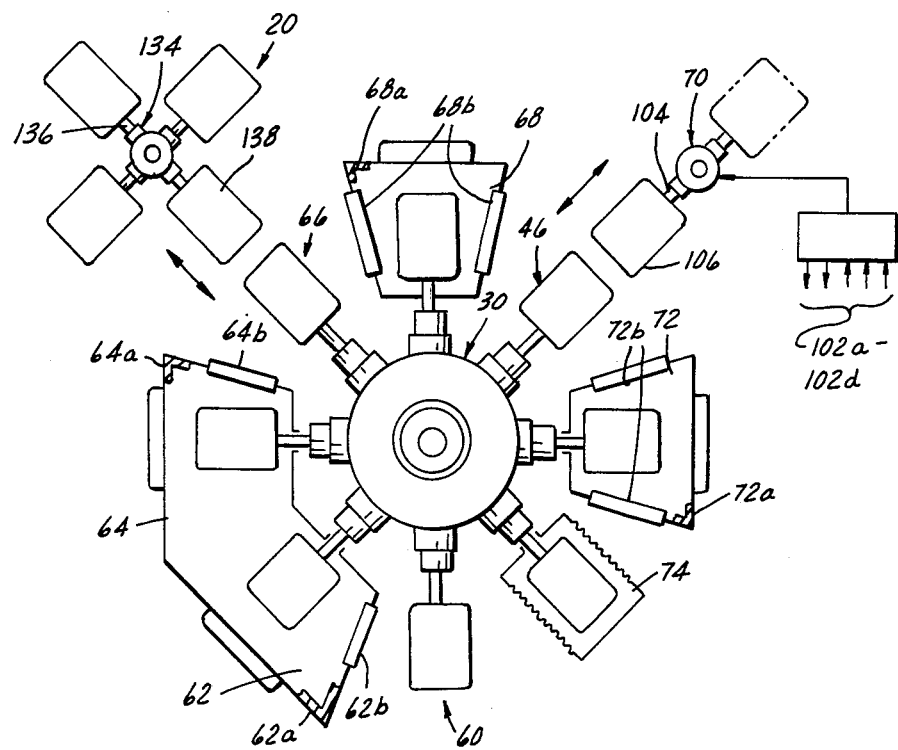
FIG. 3 is a diagrammatically shown view of the powder box carrier and associated molding apparatus of the invention in association with a regrind fill station.
Figure 4:
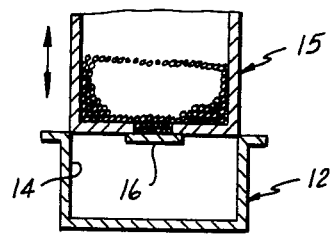
FIGS. 4–10 is a diagrammatically shown process sequence of one embodiment of the process of the present invention.

In accordance with the process and apparatus of the present invention, the box 12 is one of many carried on a color carousel 20, best shown in FIGS. 1 and 3.

The color carousel 20 has separate elevators 21 each carrying a reservoir box 15 with a charge of plastic powder material of a different color.

The color carousel 20 concurrently rotates the boxes 12 from a bull gear 22 driven by a motor 24 which is indexable in two directions under the control of a color carousel controller 26. The controller 26 is associated with a programmable logic controller 28 to establish which one of the boxes 12 will be off-loaded to casting machine 30.

The programmable controller 28 includes a master control station (MCS 32) with either a paper tape or cassette input. The MCS 32 further includes a CRT indicating the color programmed for each arm of a casting machine 30.

The casting machine 30 includes eight arms 34a–34h each supported on a rotatable carriage 36 which is driven by a motor 38 and transmission through a bull gear 40.

Each arm 32a–32h of the casting machine 30 includes an operating shaft 42 which is coupled to a transmission 44 which will rotate the shaft 42 about its longitudinal axis 42a.

Each arm 34a–34h is secured to a mold frame 46 that has spaced parallel tracks 48,50 that will support side flanges 52,54 on each of the powder boxes 12 when the powder box 12 is off-loaded from the color carousel to one of the frames 46.

Each frame 46 further includes upper tracks 56,58 for supporting a mold 10 one of which is shown in dotted line at arm 34d shown at an operator station 66.

A mold 10 is initially loaded at operator station 60. The casting machine will drive it sequentially in seriatim with respect to a first oven station 62; a second oven station 64; a color molding station 66; a third oven station 68; a filler molding station 70; a fourth oven station 72; and a cooling station 74.

When the mold 10 is aligned with the color molding station 66 a preselected color has been indexed to locate a powder box of a given color in an off-loading position. A reservoir 15 is filled with one of the selectable colors is raised on elevator 21 to clear a precisely charged color box 12 which is then off-loaded by a conveyor 76 including a drive chain 78 and motor 80.

Figure 10:
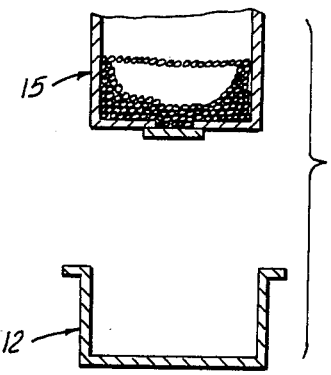

The off-loaded powder box 12 is supported by frame 46. Box 12 and heated mold 10 are clamped at station 66, shown in FIG. 7. Then the frame 46 is rotated to distribute powder into the mold as shown in FIG. 8. The frame 46 is rotated to return excess powder to the powder box 12 as shown in FIG. 9. Thereafter the powder box 12 is returned to the carousel 20 to be realigned with the raised reservoir 15 as shown in FIG. 10. The reservoir 76 and powder box 12 are then returned to their original color loading position shown in FIG. 4. The distributor plate 16 is activated by a motor controlled by signals from a refill command circuit 75. An air solenoid 77 is provided to control air sweeps or the like in the system.

The programmable controller 28 is programmed so that each arm 34a–34h is programmed for rotation of the mold frame 46 to determine the proper mold attitude during operation of the casting machine 32. A position sensor line 61 is provided to receive signals from transducers that indicate position of the mold frame 46 to provide such information to controller 28.

At oven station 62 oven controls 78 are provided to both indicate and set temperatures in the oven. The oven controls 78 include a start-up temperature signal line 80 running from interface and logic circuits 82; a temperature-reached signal line 84 from the control 78 to the interface and logic circuits 82 and an oven door open signal line 86 from the circuits 82.

A like start-up temperature line 88; temperature reached signal line 90; oven door open signal line 92; and temperature-reached signal line 94 is provided between circuits 82 and oven controls 96 for the second oven 64. The first and second ovens preferably are two station pre-heat ovens which are gas fired or equivalently heated. In one working embodiment a two hundred fifty degree fahrenheit (250° F.) mold temperature range is controlled.

Oven station 68 is a cure oven. It has start signal, ready signal, door opening and temperature setting signal lines 98a–98d interacting between an oven controller 100 and the circuits 82.

Station 70 is a filler molding station in which a second charge of reground material is transferred from a powder box top filled with reground material. In the illustrated arrangement, start, ready, move tray and air signal lines 102a–102d are provided to control a conveyor 104 to move a powder box 106 of reground material to the frame 46. The filler molding station will be operated to cast a second charge of powder into a mold if desired for a particular part.

Oven station 72 is a second cure station which has an oven controller 106 with signal lines 106a–d which are connected to control circuits 82 to control start up temperature; ready temperature; oven door; and temperature setting of the oven, respectively.

Infrared sensors 108a–108c are provided at ovens 62, 64, 68 and 72 to feed back oven temperature signals to the respective oven controls.

Cooling station 74 has an infrared sensor 108 that is connected through a signal conditioner circuit 110 to produce an actual temperature signal on line 112 to programmable controller 28 that is programmed to energize an air drive system 114; and air valve 116 and a cooling water valve 118 via control signal lines 118a–c to produce a selective cooling of the exterior surface of the mold. Following cooling the molded part is stripped from the mold at the unload/operators station.

The color carousel controller 26 converses with controller 28 via a position line 120 that sends a signal of correct carousel position as indicated by position sensory means 122.

The programmable controller provides air; desired color; move powder box and start signals to color carousel controller via lines 124a–124d, respectively.

These signals are utilized by color carousel controller 26 to produce a speed signal and direction signal on line 126,128 to motor 24 for controlling the speed and direction of rotation of the carousel. Speed and direction signals on lines 130,131 are directed to conveyor motor 80 at the color molding station 66. If desired, a vibrator 132 can be operate in response to a signal on line 134 to vibrate the powder box prior to the color molding operation.

The primary control for advancing of the casting arms will be by mold temperature in the first cure oven 68. This oven will be temperature controlled at some predetermined temperature within ±1° F. When the mold temperature has reached a predetermined point, movement of the arms 32a–32h will be initiated. It must be recognized that with different molds on each arm and with a varying ambient temperatures, the time required to reach proper mold temperature in the first cure oven 60 will not always be the same. Because of this, control of the pre-heat oven will be somewhat different. It is proposed that the pre-heat oven temperature be controlled such that the mold temperature be maintained with a 13° F. range; adaptive control may be used that will compensate for changes in ambient temperature and, therefore, differences of mold temperature as it enters the oven 62. The control also is programmed to recognize which mold is in the pre-heat oven and also adjust for differences in mold types.

Because the mold temperature exiting the pre-heat oven cannot be maintained within precise limits, the casting time will be controlled as a function of temperature. The mold temperature will be sensed immediately prior to the casting, and this temperature will determine the dwell time.

The second cure oven 72 will control mold temperature through modulation of the oven temperature and will not affect the cycle in any way.

As best shown in FIG. 3, each oven has an outer enclosure 62a, 64a, 68a and 72a with movable access doors 62b, 64b, 68b and 72b which enable the rotating arms to clear the enclosure and which close to retain heat in the enclosures. In the embodiment of FIG. 3 the color carousel 20 is in the form of a multiple arm robot 134 which has arms 136 each of which reciprocates to move a powder box 138 to the casting machine 30.

Figure 2:
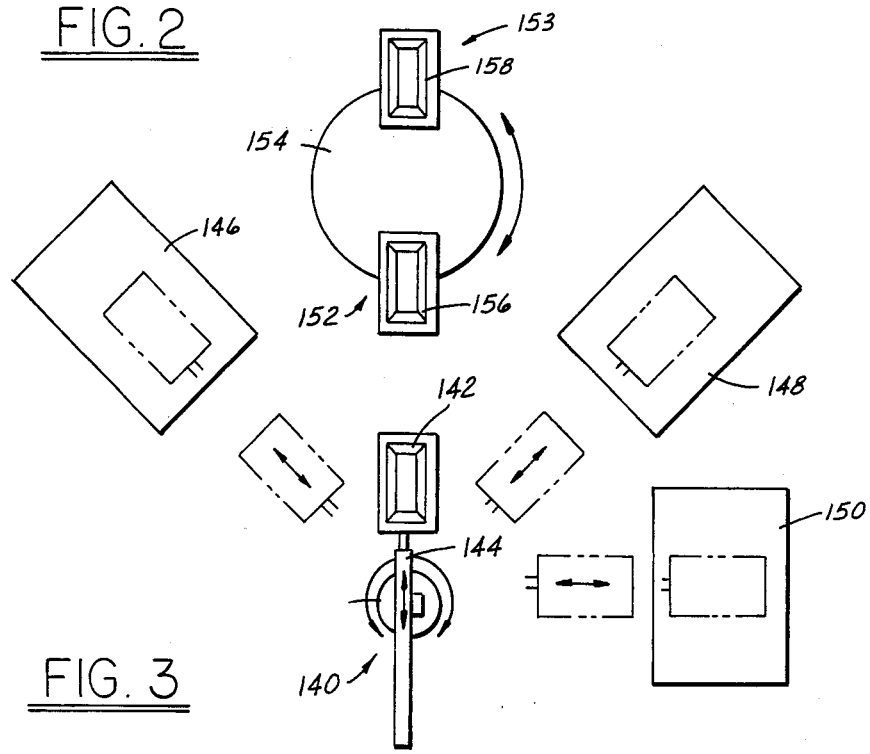
FIG. 2 is a diagrammatic view of another embodiment of molding apparatus of the inventive apparatus.

The embodiment in FIG. 2 is an embodiment in which a centrally located robot 140 carries a mold frame 142. The mold frame 142 is carried on an arm 144 which reciprocates with respect to a base 146. The arm 144 and frame are pivoted on base 146 to move the frame 142 into and out of a preheat oven 146; a cure oven 148 and a cooling station 150. In this embodiment, casting occurs at a solid color station mold station 152 or two-tone molding station 153 on a rotary carousel 154. A solid color powder box 156 is connectable to a heated mold on frame 142 when it is off-loaded at station 152. The box 156 is rotated with the off-loaded mold to cast powder at station 152. A second two-tone station 153 can be provided with a two-compartment box 158 to cast two colors (as set forth in the aforementioned co-pending U.S. application Ser. No. 614,004).

Following casting at either station 152,153 the mold with powder cast thereon is carried by robot 140 to the cure oven 148 and cooling station 150.

Figure 11:
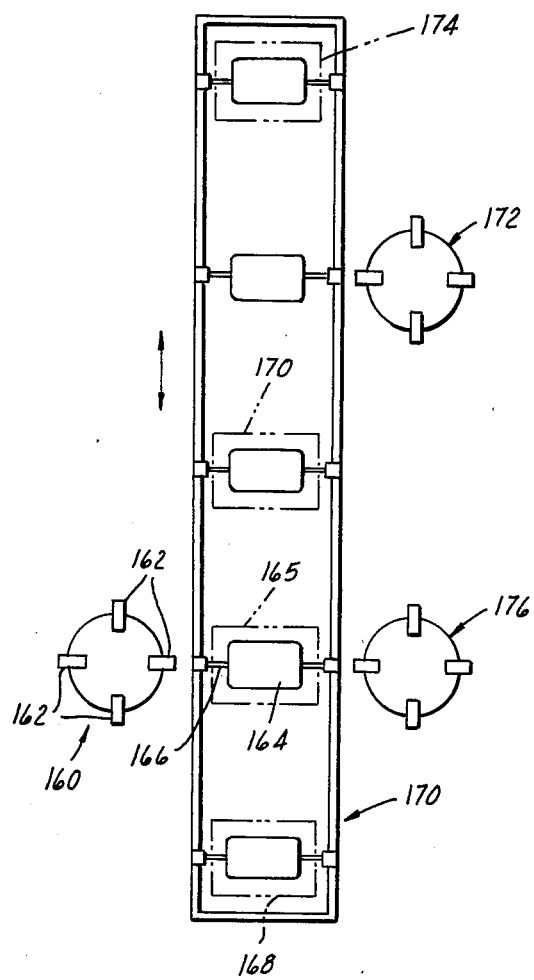
FIG. 11 is a diagrammatically shown view of another embodiment of a powder box carrier and molding apparatus.

Yet another embodiment of the invention is set forth in FIG. 11 wherein a said color carousel 160 is associated with a continuous belt conveyor/casting apparatus 170. The carousel 160 has four individual solid color powder boxes 162. The boxes are advanced by side loader lines (either robots or conveyors) to alignment with a heated mold 164 at a color molding station 165. The box and mold 146 are joined and rotated on axis 166 to cast powder. The mold 164 is preheated at a preheat oven 168 (shown in outline). After casting, the powder box is returned to the carousel and the mold with cast material is advanced to a cure oven 170; a second fill station 172; and a second cure station 174.

The return line includes a cooling station (not shown). A two-tone color carousel 176 with four boxes with two color distribution can be provided at the color molding station 165.

In the aforesaid embodiment the mold frames (carriers) contain the locking units and move along the chain or track apparatus. Arms or mechanisms of the molds are operated outside the oven as much as possible so as not to over-expose the hardware to excessive heat.

Customer color changes are made by container changes. For example, changes from a Ford red to a GM red can be accomplished without any lost production merely by changing containers on the carousels. Color boxes on the carousels can be moved to the color loading area, released and held to the color carousel platform.

The platform or components thereon can then move in alignment with the mold and in interlocking relationship, at which point the casting cycle would begin.

Each concept is adaptable for two-fill (Drysol shell with foam backing) operation.

This manufacturing concept lends itself to a one on one foaming line and enables a manufacturer to adopt the "just-in-time" supply concepts because of the scheduling flexibility that is inherent in the apparatus and process.

What is claimed is:

1. Apparatus for molding a thin-walled plastic shell in a heated open-ended mold from a charge of thermoplastic powder material in open-ended powder box means comprising; carousel means having a plurality of separate powder boxes thereon; a mold station; means for off-loading a powder box from said carousel at said mold station; a drive; a heatable mold connected to said drive; means for joining said heatable mold to said off-loaded powder box in open-ended relationship without disconnecting said mold from said drive; mold indexing means including said drive for indexing heated molds with respect to said carousel; said mold indexing means including a rotatable arm, means for rotating said arm to control the attitude of said joined box and mold to distribute a charge of thermoplastic material against the casting surfaces of the mold; preheat and cure ovens; and said mold index means positioning said arm to carry said mold with respect to said preheat and cure ovens prior to and subsequent to off-loading from and return of said box to said carousel.

2. In the apparatus of claim 1
said powder box means including a pair of side flanges and a compartment having a predetermined charge of thermoplastic powder; said arm having a mold frame including means for connecting said side flanges thereto for locating said box thereon,
and means for engaging said mold with said frame for receiving powder from the box compartment when the box and mold are joined and rotated.

3. In the apparatus of claim 1 said mold indexing means including a plurality of arms, a mold frame on each of said arms, means for coupling a heatable mold to each of said frames, means for separately rotating each of said arms and means selectively programming each of said arms to be rotated at said mold station to control the attitude of said frame for casting mold material onto the mold only at said mold station; said carousel means being indexed to a provide a powder box of desired type at said mold station so as to program a flexible production of molded parts.

4. In the combination of claim 1, said carousel means including a plurality of powder supply reservoir means; means for selectively filling one or more of the powder boxes from said reservoir means on said carousel means; and means including a conveyor to off-load a powder box following fill from said reservoir means to said mold indexing means for transferring powder from the box to a preheated mold.

5. In the combination of claim 4, elevator means on said carousel means for positioning said reservoir means in raised and lowered positions with respect to one of said powder boxes, said powder box being off-loaded from said carousel means only when said reservoir is in its raised position.

6. In the combination of claim 1, a preheat oven, a cure oven and a cooling station, said rotatable arm means being selectively indexed with respect to said ovens and enclosures for said ovens and cooling station, each of said ovens has access doors thereto and means for programming said access doors to open and close upon indexing of said rotatable arm means with respect thereto.

7. In a process for molding different colored parts on a mold which remains coupled to a drive for advancing the mold in seriatim with respect to multiple work stations including mold heating, casting and cooling stations and powder boxes coupled to the mold for providing thermoplastic material to be cast against the mold when it is heated to form a part thereon the improvement comprising:
separately reservoiring a plurality of different color thermoplastics on a single rotary platform;
selectively pre-filling a different powder box from each one of the reservoirs to define separate sources of different color thermoplastic for off-loading onto the drive;
coupling a selected one of the pre-filled powder boxes with a drive connected mold without disconnecting the mold from the drive as the mold is advanced thereby in seriatim with respect to the work stations;
maintaining the selected mold coupled to the drive and retaining it on the drive as the mold is positioned by the drive at all of the working stations without disconnecting the mold from the drive.

8. In the process of claim 7, reservoiring each of the different colors by vertically adjusting them between raised and lowered positions with respect to a selected powder box;
filling a selected powder box only when the reservoir is in a lowered position and transferring the selected powder box from the single rotary platform to the drive only when the reservoir is raised.

9. In the process of claim 7, casting the thermoplastic material from the powder box while on the drive by rotating the powder box into a position above a heated mold; inverting the heated mold following casting to return excessive thermoplastic material to the powder box;
returning the excess material and powder box to the single rotary platform prior to transfer of the mold in seriatim to the following process work stations.

10. In the process of claim 8, casting the thermoplastic material from the powder box while on the drive by rotating the powder box into a position above a heated mold; inverting the heated mold following casting to return excessive thermoplastic material to the powder box;
returning the excess material and powder box to the single rotary platform while the reservoir is in its raised position and prior to transfer of the mold in seriatim to the following process work stations.

* * * * *